UNITED STATES PATENT OFFICE.

CHARLES M. WETHERILL, OF LAFAYETTE, INDIANA, ASSIGNOR TO ISAAC R. DILLER, OF SPRINGFIELD, ILLINOIS.

IMPROVED APPARATUS FOR THE MANUFACTURE OF GUNPOWDER.

Specification forming part of Letters Patent No. 42,057, dated March 22, 1864.

*To all whom it may concern:*

Be it known that I, CHARLES M. WETHERILL, Ph. D., M. D., analytical chemist, of the city of Lafayette, county of Tippecanoe, State of Indiana, have invented new and useful methods and machinery for the manufacture of gunpowder or of any similar explosive or deflagrating compound by operations involving the use of heat in dissolving subsequent evaporation and final desiccation of the ingredients; and I do hereby declare that the following is a description of the same.

The apparatus consists of two parts, each of which may be used independently of the other, viz:

First, the boiling and evaporating pan, which is to be made (of any convenient shape) of boiler-iron, or of some other metal proper to resist the pressure of the steam or other vapor employed as a source of heat. The said pan must be made with double bottom and sides, or with double bottom alone, so that a receptacle be formed for the condensation or circulation of hot steam or other vapors, or hot liquids or gases, which is or are thereby separated from the contents of the pan by the metal.

I prefer the use of steam of such a pressure that the contents of the pan may be raised to a temperature of from 214° to 219° Fahrenheit.

I claim also the employment of coils of pipe as a substitute for the aforesaid receptacle, or any similar device which shall substantially apply the heat of the hot liquids, gas, or vapor.

I claim also the heating, wholly or in part, of the boiling-pan by blowing steam immediately through the contents by the devices usual in machinery, and the evaporation by blowing hot air through said contents by the said devices.

The following is an example of the use of the aforesaid boiling and evaporating pan in making a gunpowder composed of chlorate of potassa, lamp-black, and sawdust. In the pan heated to the proper temperature is placed boiling water in quantity sufficient to hold in solution at the boiling temperature the quantity of chlorate of potassa. The lamp-black is then added and stirred until perfectly moistened, then the chlorate until dissolved, and finally the sawdust. By means of the devices I have described the chlorate of potassa is thoroughly dissolved, and, aided by the agitation of the mass, is brought into a condition of intimate mixture with the lamp-black and sawdust. To complete the manufacture of the gunpowder the heat and stirring are continued until the mass is desiccated.

Secondly, the drying apparatus consists of a series of hollow shelves composed of boiler-iron or of coils of pipe, in which circulates or condenses hot steam or other vapors, hot-air gases or hot liquids, the disposition of the shelves or coils of tubes being such that the material to be dried (which is placed in shallow pans or trays) has the source of heat above and below it.

The whole system of shelves or coils of pipe is contained in an air-tight receptacle provided with ventilation for carrying off the moisture by the usual devices, which air-tight receptacle may be made of any required dimensions from those of a small box to those of a large room.

I claim—

The use of this drying apparatus for completing, if it be needed, the desiccation of the aforesaid explosive or deflagrating compound after it shall have left the aforesaid boiling and evaporating pan.

CHARLES M. WETHERILL.

Witnesses:
ISAAC R. DILLER,
DAN. ROWLAND.